Nov. 21, 1950 N. E. LINDENBLAD 2,530,580
MULTICHANNEL SIGNALING SYSTEM
Filed Oct. 30, 1946
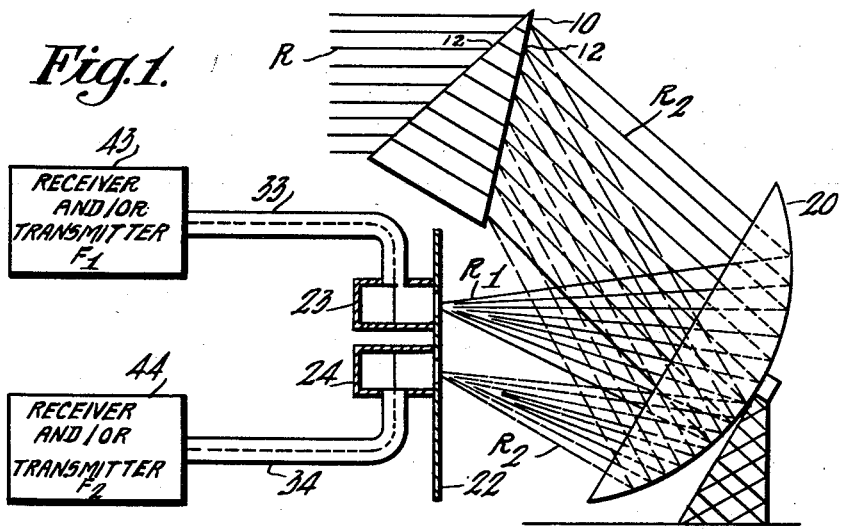
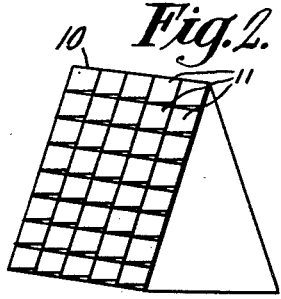
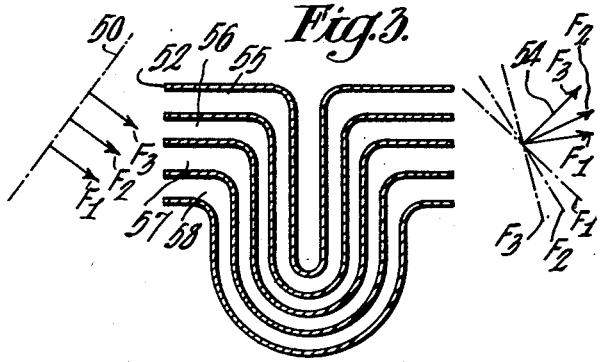
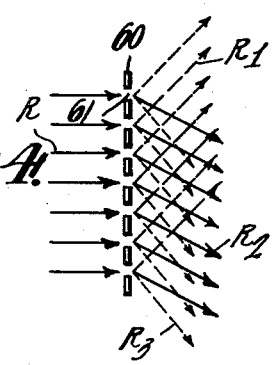
INVENTOR
Nils E. Lindenblad
BY
H. S. Grover
ATTORNEY Patented Nov. 21, 1950

2,530,580

UNITED STATES PATENT OFFICE 2,530,580

MULTICHANNEL SIGNALING SYSTEM

Nils E. Lindenblad, Port Jefferson, N. Y., assignor to Radio Corporation of America, a corporation of Delaware Application October 30, 1946, Serial No. 706,782

17 Claims. (Cl. 343—100)

The present invention relates to multi-channel communication systems and more particularly to a system for separating various high frequency communication channels in, for example, centimeter band regions.

An object of the present invention is the provision of a novel system for use in a multi-channel ultra high frequency communication system for separating the various high frequency communication channels one from the other.

A further object of the present invention is the provision of a system as aforesaid which is extremely simple in its mechanical arrangement.

A further object of the present invention is the provision of a refractive system for separating one ultra high frequency wave from a group of others.

A further object of the present invention is the application of optical principles to ultra high frequency radio communication systems.

The foregoing objects and others which appear from the following detailed description are attained by utilizing either velocity or spacing refraction or interference for separating one ultra high frequency wave from a group or band of ultra high frequency waves. Either transparent or reflective systems may be used.

In essence the present invention in one aspect may involve the use of a system of transmission channels such as transmission lines or wave guides having different lengths or phase delays in order to refract a beam including a plurality of high frequency waves. The waves of different frequency emerge from the refractive system at different angles as discrete rays dispersed in the order of their wavelengths. The individual rays may be picked up at different places and separated without the use of complex electrical filter elements. A cellularly arranged wave guide system may be used, so dimensioned that substantial velocity variation may be obtained for small frequency variations. Toward the cut-off frequency for a wave guide the cross section of the guide has an increasingly critical relationship to the wavelength. That is, a small change in frequency has a large effect on the wave velocity within the guide. Alternately the lengths of the transmission lines or wave guide cells may be made to vary across the depth of the refractive structure. This will produce an output radiation pattern having a main lobe and a number of secondary lobes. The main lobe is not appreciably warped in dependence upon the frequency but the secondary lobes are. Thus, in the practice of this form of my invention, only the secondary lobes are used. Either means for obtaining a varying phase delay with respect to frequency across the width of the refractive structure is considered applicable to the present invention. After the various frequencies have been separated by the dispersing structure, a reflective concave mirror may be used for focusing the various frequencies at individual slot antennas or wave guide terminals. If desired, refractive focusing means may be substituted for the concave mirror. If care is taken to avoid coupling between adjacent antennas or pick-up devices a substantially complete separation of signal energies at different frequencies is provided.

The system of the present invention is especially adaptable for use in multiplex radio relaying systems.

The present invention will be more fully understood by reference to the following description which is accompanied by a drawing in which:

Figure 1 illustrates in diagrammatic form an embodiment of the present invention; while Figure 2 illustrates in perspective view a cellular wave guide prism useable in the system of Figure 1; while Figure 3 illustrates a modified form of dispersing structure which may be used in the system of Figure 1; and Figure 4 illustrates in diagrammatic form the use of an interference grating for obtaining a frequency dispersion effect which may be employed in practicing my invention.

Referring now to Figure 1 there is shown a cellular wave guide prism 10 arranged in the path of a beam of radio frequency energy of various frequencies. The beam is generally designated by reference character R. Now the cellular wave guide prism 10 is arranged to have a variable function of propagation velocity for the band of operating frequencies impinging on the entering face of the prisms. If the cells have the same cross section but different lengths as becomes natural in a prismatic stacking a varying phase delay with frequency through the different cells is obtained due to variations in velocity at different frequencies. Due to the varying phase delay the beam of energy R' emerging from the prism is refracted in somewhat the same way as a beam of white light is broken up into its component colors when passing through a prism. Since the wave velocity in the prism is different for each frequency, each frequency forms a parallel beam of its own at an angle of refraction different from all of the others. A representative pair of beams are identified in Figure 1 by reference characters $R_1$ and $R_2$. The separate beams $R_1$ and $R_2$ are arranged to impinge on a parabolic reflector 20 to bring the beams to a focus on a common focal plane 22. Beams $R_1$ and $R_2$ focus at different points in the plane. Where beam $R_1$ is focussed on focal plane 22 a slot antenna 23 may be provided. Similarly slot antenna 24 may be provided at the focus of beam R₂. Energies picked up by slot antennas 23 and 24 are then conducted by transmission lines 33 and 34 to suitable transducer equipments 43 and 44 individual to the separate frequencies. The transducer equipments 43 and 44 would, in the case of a receiving arrangement, of course, be receivers. Transmitters may be used if it is desired to use the described system for combining a number of separate frequencies into a single beam. In a multiplex radio relaying system the cellular wave guide prisms 10 may be situated on the top of a tall tower to be within a region of maximum field strength of the radio beam R. The focussing reflector 20 and the individual pick-up arrangements may be in some cases be located on the ground below the tower. In other cases it may be necessary to mount the reflector 20 on a separate tower, depending upon the space available and the relative heights of the towers with respect to the operating wavelengths.

The cellular wave guide prism 10 is shown in a perspective view in Figure 2. Wave guide prism 10 is formed of an array of parallel walled rectangular wave guides 11. The walls of the wave guides 11 terminate along angularly disposed intersecting planes 12 of a prism as will be clearly apparent considering the view of wave guide prism 10 in Fig. 1 in conjunction with the view in Fig. 2. The wave guides 11 may all have the same transverse dimensions as shown to provide the same phase velocity therewithin of the energy transmitted therethrough. However, since this velocity differs from that of the free space velocity, it will be clear that a refraction of the waves passing therethrough results. The wave guide prism 10 and the manner of its operation will be well understood by those skilled in the art.

A modified form of prism is shown in Figure 3. Here the prism need not necessarily have a prismatic form. The varying phase delay with frequency is here obtained by using transmission lines or wave guides of different length and/or velocity. If the velocity in the ducts or coaxials of Figure 3 does not vary with frequency, there will always be a principal direction of "beaming" which does not vary with frequency. The secondary "beams" or ears will however vary in direction. It is therefore considered preferable to so arrange the duct dimensions that the velocity of the ducts vary with the frequency. The incoming wave front 50 containing frequencies F₁, F₂ and F₃ striking the front face of the transmission line prism is dispersed into separate beams due to the different lengths or propagation velocities of the individual paths through the transmission prism. For example, frequency F₁ may be delayed more in channel 55 than it is in channel 58 while the reverse may be true for frequency F₃. The delays in channel 56 and 57 would be intermediate to those in the extreme channels. Thus the wave fronts of the frequencies F₁ and F₂ and F₃ are in different directions as shown by arrows 54. A reflector and pick-up arrangement similar to that of Figure 1 may then be so arranged beyond the exit face of the prism as to intercept the outgoing wave fronts and direct them to appropriate pick-up structures.

A further modification shown Figure 4 utilizes an electrically transparent grating arrangement composed of a plurality of conductive ribbons 60 separated by narrow slots 61. The incoming ray of radio frequency energy is refracted by the slots 61 in the same way as a beam of light is refracted in an optical grating. The different frequencies are then directed in different directions as indicated by arrows R₁ and R₂ and R₃. A collimating arrangement and pick-up system such as shown in Figure 1 may be used with the grating of Figure 4.

While I have illustrated a particular embodiment of the present invention, it should be clearly understood that it is not limited thereto since many modifications may be made in the several elements employed and in their arrangement without departing from the spirit and scope of the invention.

What is claimed is:

1. A communication system wherein a plurality of high frequency carriers of different frequencies are transmitted in a single beam, including means for separating said carriers one from the other, said means having a refracting device acting to split said beam into a spectrum, individual pick-up means for said carriers and means for focusing said carriers upon said pick-up means.

2. A communication system wherein a plurality of high frequency carriers of different frequencies are transmitted in a single beam, including means for separating said carriers one from the other, said means having a refracting device acting to split said beam into a spectrum, individual pick-up means for said carriers and means for focusing said carriers upon said pick-up means, said refracting device including a cellularly arranged wave guide system, the individual guides of said system having differing delay characteristics for different frequencies.

3. A communication system wherein a plurality of high frequency carriers of different frequencies are transmitted in a single beam including means for separating said carriers one from the other, said means having a refracting device acting to split said beam into a spectrum, individual pick-up means for said carriers and means for focusing said carriers upon said pick-up means, said refracting device including a cellular wave guide system, the lengths of the individual cells of said system varying across the width of said device.

4. A communication system wherein a plurality of high frequency carriers of different frequencies are transmitted in a single beam, including means for separating said carriers one from the other, said means having a refracting device acting to split said beam into a spectrum, individual pick-up means for said carriers and means for focusing said carriers upon said pick-up means, said refracting device including a cellular prism.

5. A communication system wherein a plurality of high frequency carriers of different frequencies are transmitted in a single beam, including means for separating said carriers one from the other, said means having a refracting device acting to split said beam into a spectrum, individual pick-up means for said carriers and means for focusing said carriers upon said pick-up means, said refracting device including a cellular prism, the cells of said prism acting as wave guides of varying length.

6. A communication system wherein a plurality of high frequency carriers of different frequencies are transmitted in a single beam, including means for separating said carriers one from the other, said means having a refracting device acting to split said beam into a spectrum, individual pick-up means for said carriers and means for focusing said carriers upon said pick-up means, said refracting device including a cellular prism, the cells of said prism being arranged parallel to one face of said prism and normal to the longitudinal axis thereof.

7. A communication system wherein a plurality of high frequency carriers of different frequencies are transmitted in a single beam, including means for separating said carriers one from the other, said means having a refracting device acting to split said beam into a spectrum, individual pick-up means for said carriers and means for focusing said carriers upon said pick-up means, said refracting device including a cellular wave guide arrangement, the individual guides of said arrangement being so dimensioned that a substantial phase variation with respect to wavelength is obtained across the width of said arrangement.

8. A communication system wherein a plurality of high frequency carriers of different frequencies are transmitted in a single beam, including means for separating said carriers one from the other, said means having a refracting device acting to split said beam into a spectrum, individual pick-up means for said carriers and means for focusing said carriers upon said pick-up means, said refracting device including a cellular wave guide arrangement, the individual cells having such lengths that a substantial phase variation with respect to frequency is obtained across the width of said arrangement.

9. A communication system wherein a plurality of high frequency carriers of different frequencies are transmitted in a single beam, including means for separating said carriers one from the other, said means having a refracting device acting to split said beam into a spectrum, individual pick-up means for said carriers and means for focusing said carriers upon said pick-up means, said refracting device including a cellular wave guide arrangement, the individual cells having such widths that a substantial velocity variation with respect to frequency is obtained across the width of said arrangement.

10. A communication system wherein a plurality of high frequency carriers of different frequencies are transmitted in a single beam, including means for separating said carriers one from the other, said means having a refracting device acting to split said beam into a spectrum, individual pick-up means for said carriers and means for focusing said carriers upon said pick-up means, said refracting device including a cellular wave guide arrangement, the individual cells having a cross section such that the guide operates near its cut-off frequency whereby a substantial phase variation with respect to frequency is obtained across the width of said arrangement.

11. A communication system wherein a plurality of high frequency carriers of different frequencies are transmitted in a single beam and including means for spreading said beam into a developed spectrum of frequencies having an individual portion for each one of said carrier frequencies, means for focusing said individual frequency portions of said spectrum upon individual pick-up means, and means for coupling said pick-up means to transducer apparatus.

12. A communication system wherein a plurality of high frequency carriers of different frequencies are transmitted in a single beam and including means for spreading said beam into a developed spectrum of frequencies having an individual portion for each one of said carrier frequencies, means for focusing said individual frequency portions of said spectrum upon individual pick-up means, and means for coupling said pick-up means to transducer apparatus, said first mentioned means including a refracting prism.

13. A communication system wherein a plurality of high frequency carriers of different frequencies are transmitted in a single beam and including means for spreading said beam into a developed spectrum of frequencies having an individual portion for each one of said carrier frequencies, means for focusing said individual frequency portions of said spectrum upon individual pick-up means, and means for coupling said pick-up means to transducer apparatus, said first-mentioned means including a diffraction grating.

14. A communication system wherein a plurality of high frequency carriers of different frequencies are transmitted in a single beam and including means for spreading said beam into a developed spectrum of frequencies having an individual portion for each one of said carrier frequencies, means for focusing said individual frequency portions of said spectrum upon individual pick-up means, and means for coupling said pick-up means to transducer apparatus, said first-mentioned means including a diffraction grating in the form of a plurality of narrow conductive strips arranged in a spaced apart relationship in a single plane.

15. A communication system wherein a plurality of high frequency carriers of different frequencies are transmitted in a single beam and including means for spreading said beam into a developed spectrum of frequencies having an individual portion for each one of said carrier frequencies, means for focusing said individual frequency portions of said spectrum upon individual pick-up means, and means for coupling said pick-up means to transducer apparatus, said first-mentioned means including a diffraction grating in the form of a plurality of narrow conductive strips arranged in a spaced apart relationship in a single plane, the spacing of said strips being such as to provide a plurality of diffractive slots across the width of said grating.

16. A communication system wherein a plurality of high frequency carriers of different frequencies are transmitted in a single beam, including means for separating said beam into a developed spectrum of frequencies having an individual portion for each one of said carrier frequencies, individual pick-up means for each said individual portion of said spectrum, and means for coupling each said pick-up means to an individual transducer apparatus.

17. The system of claim 16 further comprising means for focusing said individual portions of said spectrum on each said pick-up means.

NILS E. LINDENBLAD.

REFERENCES CITED

The following references are of record in the file of this patent:

UNITED STATES PATENTS

| Number | Name | Date |
|---|---|---|
| 2,042,302 | Frantz et al. | May 26, 1936 |
| 2,362,561 | Katzin | Nov. 14, 1944 |
| 2,364,371 | Katzin | Dec. 5, 1944 |
| 2,367,764 | Ferris | Jan. 23, 1945 |
| 2,408,435 | Mason | Oct. 1, 1946 |